(12) United States Patent
Satone et al.

(10) Patent No.: US 7,939,796 B2
(45) Date of Patent: May 10, 2011

(54) ELECTRONIC DEVICE HOUSING

(75) Inventors: Toshikazu Satone, Tokyo (JP); Mikio Iijima, Tokyo (JP); Hajime Nakajima, Tokyo (JP); Takashi Okamuro, Tokyo (JP); Yohichi Ohmura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 232 days.

(21) Appl. No.: 12/295,920

(22) PCT Filed: Mar. 29, 2007

(86) PCT No.: PCT/JP2007/056819
§ 371 (c)(1),
(2), (4) Date: Nov. 24, 2008

(87) PCT Pub. No.: WO2007/116801
PCT Pub. Date: Oct. 18, 2007

(65) Prior Publication Data
US 2010/0148044 A1 Jun. 17, 2010

(30) Foreign Application Priority Data
Apr. 3, 2006 (JP) ................................ P2006-101915

(51) Int. Cl.
*G01B 11/26* (2006.01)
*G01D 5/34* (2006.01)
(52) U.S. Cl. .................. 250/231.13; 250/239; 361/748; 29/592.1
(58) Field of Classification Search .................. 250/239, 250/231.13; 361/748, 752, 760; 29/592.1, 29/598
See application file for complete search history.

(56) References Cited

U.S. PATENT DOCUMENTS

| | | | |
|---|---|---|---|
| 6,901,682 B2 | 6/2005 | Igaki et al. | |
| 7,414,238 B2 | 8/2008 | Igarashi et al. | |
| 2007/0070298 A1 * | 3/2007 | Hara et al. | ...................... 353/57 |

FOREIGN PATENT DOCUMENTS

| | | | |
|---|---|---|---|
| JP | 60-037866 U | | 3/1985 |
| JP | 63-185523 U | | 11/1988 |
| JP | 63-188519 U | | 12/1988 |
| JP | 8-148873 A | | 6/1996 |
| JP | 08-148873 A | | 6/1996 |
| JP | 2002340624 A | | 11/2002 |
| JP | 2003014497 A | | 1/2003 |
| JP | 2004050488 A | * | 2/2004 |
| JP | 2004-268936 A | | 9/2004 |
| JP | 2005053179 A | | 3/2005 |
| WO | 2006035686 A1 | | 4/2006 |

OTHER PUBLICATIONS

Japanese Office Action, dated Sep. 7, 2010, issued in application No. 2008-509806.
Taiwanese Office Action, dated Sep. 23, 2010, issued in Application No. 096111551.

* cited by examiner

*Primary Examiner* — Kevin Pyo
(74) *Attorney, Agent, or Firm* — Sughrue Mion, PLLC

(57) ABSTRACT

An electronic device housing includes a metallic base part 101; a resin part 402 fixed to the base part 101; and a printed circuit board 104 coming into contact with the resin part 402; wherein bonding of the base part 101 to the resin part 402 is carried out by way of a nanomold technique and wherein the resin part 402 has insulating property.

4 Claims, 5 Drawing Sheets

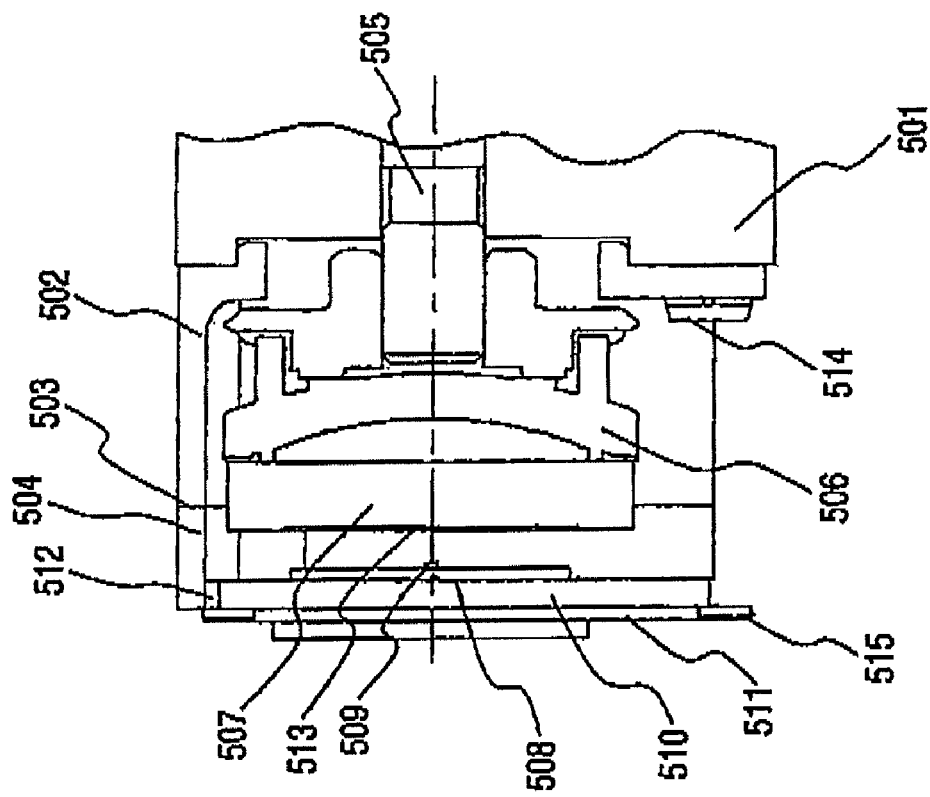
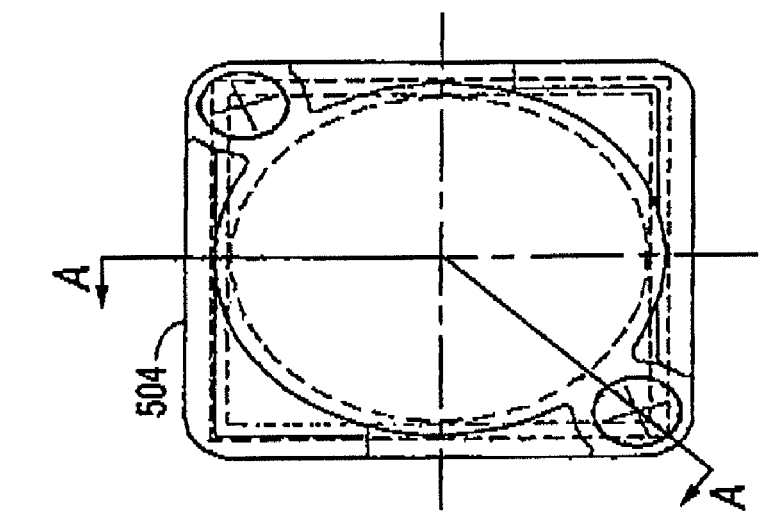

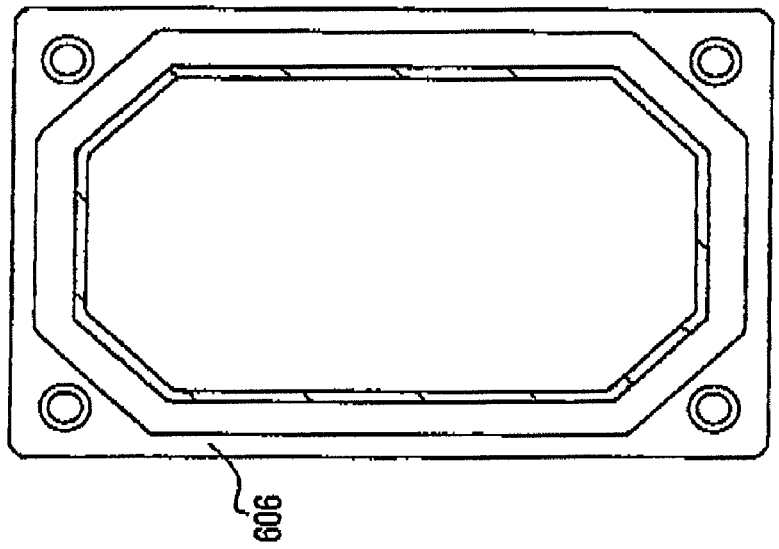
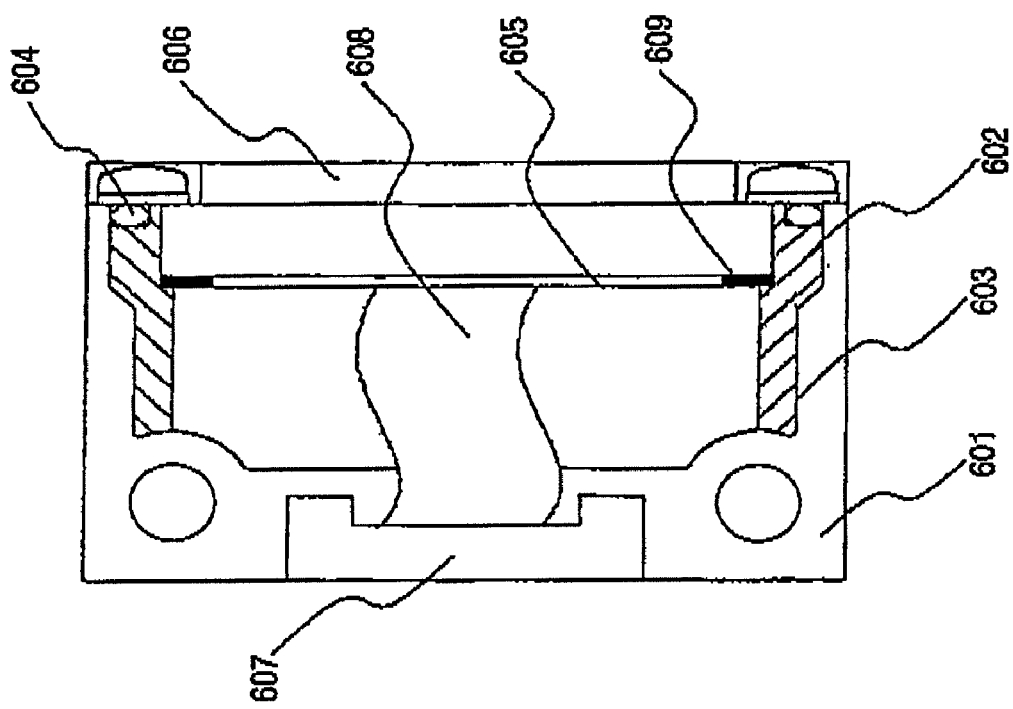

ELECTRONIC DEVICE HOUSING

TECHNICAL FIELD

The present invention relates to a housing of an electronic device, in particular to a housing of a compact encoder used for a servo motor in a drive controller, which incorporates a printed circuit board and having a rigid structure.

BACKGROUND ART

By way of a specific example in the background art, the structure of an optical encoder as an electronic device will be described. The "optical encoder" is an electronic device used as a rotation detector for a servo motor used in the field of industrial equipment, in particular in the factory automation field. The optical encoder is an electronic device which incorporates a printed circuit board and which requires high rigidity as well as compact and lightweight design.

FIG. 4 is a cross-sectional view of the general configuration of a known optical encoder in the related art. FIGS. 5 and 6 are cross-sectional views of the general configurations of other examples of known optical encoders in the related art.

In FIG. 4, the base part 101 of an optical encoder that requires rigidity is generally made of a metal, and often of aluminum die cast to enhance mass productivity. A rotary part 102 is a pattern disc coupled to a rotary body (not shown) such as a rotor in a motor. An insulating part 103 is a component made of resin and insulates the base part 101 from a printed circuit board 104. A printed circuit board 104 mounts a light-receiving element, a light-emitting element, or an electronic circuit for performing signal processing (described later). An insulating part fixing screw 105 is used to fix the insulating part 103 onto the base part 101. A detector 106 is mounted on the printed circuit board 104.

In the example of FIG. 4, the fixing screw 105 is required to fix the insulating part 103. Positioning of the base part 101 and the insulating part 103 is made via this fixing screw 105. Thus, accuracy of positioning could be reduced by a clearance between the outer diameter of the fixing screw 105 and the screw hole in the insulating part 103. Unless the relation between the detector 106 and the pattern disc as the rotary part 102 is ultimately in a proper state, the performance of detecting the position of a rotary body as a function of an encoder will be substantially influenced. The use of the fixing screw 105 leads to an increase in the number of components, mounting man-hours and product mass.

In FIG. 5, a base part 101, a rotary part 102, a printed circuit board 104, and a detector 106 are components having the same functions as those in FIG. 4 so that the corresponding description is omitted.

The optical encoder shown in FIG. 5 includes the base part 101 and the printed circuit board 104 and thus features high rigidity. Disadvantageously, the printed circuit board 104 is in direct contact with the base part 101 made of a metal so that no components or patterns can be arranged on a portion where the printed circuit board 104 is in contact with the base part 101. A hatched portion shown as an insulating part 104a in the printed circuit board is the portion where no components or patterns can be arranged. This reduces the area of a printed circuit board that can be used effectively. This problem is serious in an application of compact electronic devices.

In FIG. 6, a base part 101, a rotary part 102, an insulating part 103, a printed circuit board 104 and a detector 106 are components having the same functions as in FIG. 4 so that the corresponding description is omitted. An adhesive part 301 shown in FIG. 6 is intended to bond the base part 101 to the insulating part 103. The base part 101 and the insulating part 103 in FIG. 6 are bonded to each other at the adhesive part 301 by an adhesive thus possibly reducing the accuracy of positioning of the base part 101 and the insulating part 103. Unless the relation between the detector 106 and the pattern disc as the rotary part 102 is ultimately in a proper state, the performance of detecting the position of a rotary body as a function of an encoder will be substantially influenced.

The adhesive part 301 is interposed between a base part 1 and an insulating part 3. An adhesive having reduced rigidity could reduce the rigidity of the entire encoder. The adhesive part 301 could be degraded by environmental conditions such as vibration, temperature and impact, thus reducing product reliability. Other possible drawbacks include an increase in the working man-hours required for bonding, an increase in the cost by the use of a potent adhesive, and reduction in the reliability due to variations in the bonding force caused by different environmental conditions in the manufacturing process.

Concerning the technology of manufacturing an electronic device housing, it has been proposed to mold a resin member and an aluminum die cast member as an integrated body and provide heat shielding as well as facilitate construction (for example, refer to Patent Reference 1).

Patent Reference 1: JP-UM-A-63-188519

DISCLOSURE OF THE INVENTION

Problems that the Invention is to Solve

However, as described above, the related art is accompanied by such problems as reduction in the area of a printed circuit board that can be used effectively, an increase in the number of components, mounting man-hours and product mass, reduction in the performance of an electronic device caused by degraded positioning accuracy, and reduction in the rigidity of an electronic device housing.

The invention has been accomplished to solve the aforementioned problems. An object of the invention is to provide a housing of an electronic device, in particular a housing of a compact encoder used for a servo motor in a drive controller, which is capable of effectively offering a component mounting area and a pattern arrangement area on a printed circuit board incorporated therein, as well as ease of construction, enhanced positioning accuracy and high rigidity.

Means for Solving the Problems

The invention provides an electronic device housing comprising: a base part; a resin part fixed to the base part; and a printed circuit board coming into contact with the resin part; wherein the base part is made of aluminum including asperities in the nanometer order formed on the surface thereof, wherein the resin part is made of an insulating resin, and wherein the resin of the resin part is bonded to the asperities by way of a key structure to fix together the base part and the resin part.

ADVANTAGE OF THE INVENTION

The invention solves the problems with the related art including reduction in a component mounting area and a pattern arrangement area on an incorporated printed circuit board and reduction of rigidity of housing. This has advantages of providing effective use of the component mounting

BRIEF DESCRIPTION OF THE DRAWINGS

FIG. 2 It is a cross-sectional view of the structure of an optical encoder according to the exemplary embodiment 1 of the invention.

FIG. 3 It shows the structure of an electronic device housing that requires sealing property according to an exemplary embodiment 2 of the invention.

BEST MODE FOR CARRYING OUT THE INVENTION

Exemplary Embodiment 1

An exemplary embodiment 1 of the invention will be described by using figures.

Figure 1:
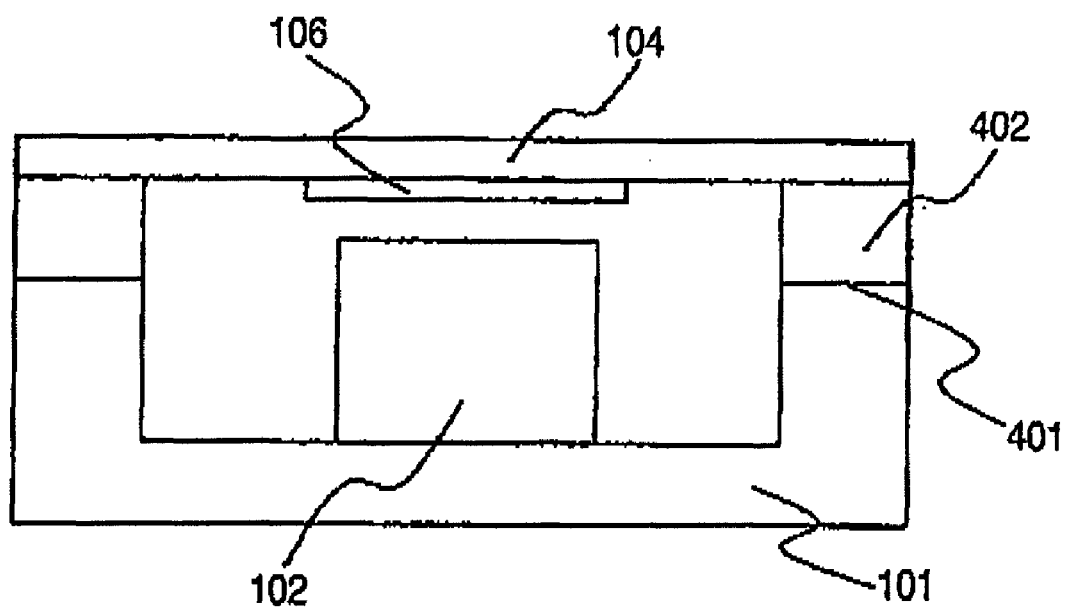
FIG. 1 It is a cross-sectional view of the general structure of an optical encoder according to an exemplary embodiment 1 of the invention.

FIGS. 1 and 2 show the structure of an electronic device housing according to this embodiment, that is, a specific structure of an optical encoder.

FIG. 1 is a cross-sectional view of the general structure of this embodiment of the invention. FIG. 1 corresponds to FIGS. 4 to 6 as exemplary structures of a related art optical encoder. FIG. 2(a) shows the encoder viewed from a bottom perpendicular to a rotary axis. FIG. 2(b) is a cross-sectional view of FIG. 2(a) taken along the arrow A-A.

Figure 4:
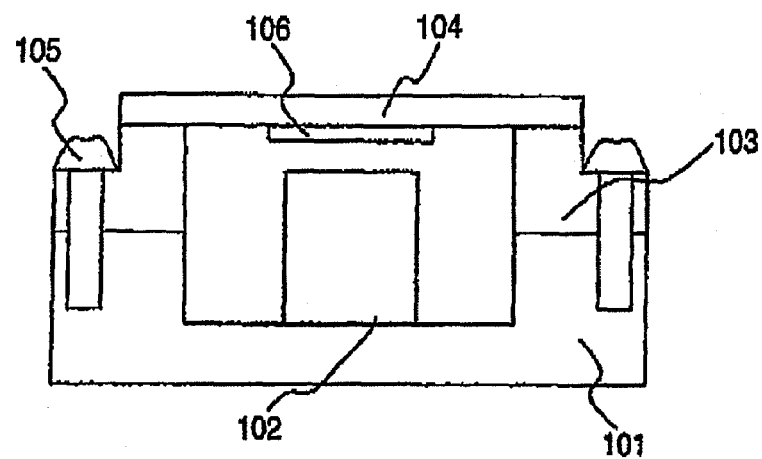
FIG. 4 It is a cross-sectional view of the general structure of a related art optical encoder.
Figure 5:
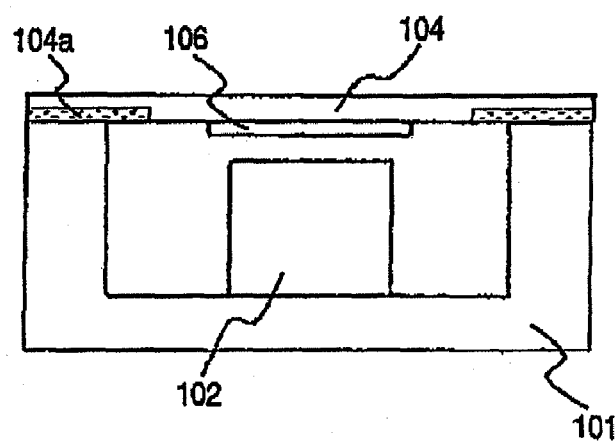
FIG. 5 It is a cross-sectional view of the general structure of a related art optical encoder.

In FIG. 1, a base part 101, a rotary part 102, a printed circuit board 104, and a detector 106 are components having the same functions as those in FIG. 4 so that the corresponding description is omitted.

In FIG. 1, a resin part 402 is fixed to the base part 101 at a nanomold part 401. The nanomold is a molding technique for adhering resin to the porous structure of aluminum by way of an anchor effect disclosed in "JP-A-2002-225073", "JP-A-2003-03563", "JP-A-2003-170531", "JP-A-2003-200453", "JP-A-2003-251654", "JP-A-2004-050488", "JP-A-2004-216425", "JP-A-2004-216609", "JP-A-2004-268936", "JP-A-2004-271161", "JP-A-2004-330509", "JP-A-2005-009728", "JP-A-2005-053179", "JP-A-2005-119005", "JP-A-2005-119237", or "JP-A-2005-136117". The nanomold technique integrates a metallic member and a resin member without using an adhesive or the like. In other words, this technique forms asperities in the nanometer order on the surface of aluminum and bonds resin to the asperities byway of a key structure. The printed circuit board 104 is arranged so as to come into contact with the resin part 402. The resin part 402 shown in FIG. 1 is made of an insulating resin having a linear expansion coefficient equivalent to that of aluminum as a material of the base part 101 and corresponds to the insulating part 103 in FIG. 4.

The base part 101 is fixed to the resin part 402 by using the nanomold technique. This dramatically enhances the positioning accuracy and rigidity compared with the related art example in FIG. 6 including an adhesive part 301 of a similar structure. That is, the resin part 402 is fixed to the base part 101 by way of injection molding so that a high degree of shape accuracy is obtained. The high shape accuracy makes it possible to allow for proper relation between the detector 106 formed by a combination of several portions and the pattern disc as the rotary part 102 and enhance the performance of detecting the position of a rotary body as an encoder function.

Bonding of the base part 101 and the resin part 402 at the nanomold part 401 is made in a tight fashion to engage the resin part 402 into the base part 101, thus providing extremely high rigidity.

Referring to FIG. 2, a motor bracket 501 and a motor shaft 505 are part of a motor (not shown). A housing 502 is made of a metal such as aluminum die cast. A resin part 504 is fixed to the housing 502 at a nanomold part 503. A mirror 506, a disc 507, and a pattern part 513 on the disc are inherent to an encoder and are coupled to the motor shaft 505. A light-emitting element 509 and a light-receiving element 508 are also inherent to an encoder and are arranged on a printed circuit board 511.

In FIG. 2, the mirror 506, the disc 507 and pattern part 513 on the disc as rotary parts and the light-emitting element 509 and the light-receiving element 508 as fixed parts arranged on a printed circuit board 511 must be precisely positioned relative to each other.

Specific operation of an encoder will be described based on FIG. 2. Light emitted from the light-emitting element 509 is partially shielded by the pattern part 513 on the disc 507. Light that has passed through the disc 507 is reflected on the mirror 506, passes through the disc 507 again and is received by the light-receiving element 508. The light then undergoes photoelectric conversion and processed as an electric signal. Unless the relation between the mirror 506, the disc 507 and the pattern part 513 as rotary parts and the light-emitting element 509 and the light-receiving element 508 as fixed parts is in a proper state, the performance of detecting the position of a rotary body as a function of an encoder will be substantially influenced, thus preventing correct detection of the position of a motor shaft by the encoder.

In case the positions of the magnetic poles of a motor as a rotary body cannot be correctly detected during speed control or positioning control using a motor, reduced performance of speed control or positioning control could result.

With this invention, it is possible to obtain a structure having high rigidity by using a component made of a metallic housing 502 and a resin part 504 fixed thereto by way of a nanomold technique. Further, a printed circuit board 511 that mounts a light-emitting element 509, a light-receiving element 508 and miscellaneous processing circuits (not shown) is arranged to come into contact with the resin part 504. This makes it possible to arrange a pattern in a portion of the printed circuit board 511 coming into contact with the resin part, which contributes to effective use of the area of the printed circuit board 511.

A detector such as an encoder is often mounted close to a driving system and thus exposed to harsh environments. That is, the detector must withstand environments such as vibration, temperature and impact. The inventive electronic device housing offers a rigid housing structure that allows the electronic device therein to work under worse environmental conditions.

The housing 502 and the resin part 504 are integrally formed. This reduces the number of components and facilitates construction.

In the example of FIG. 2, a housing 502 as a metallic part is fixed firmly onto a motor bracket 501 byway of a housing fixing screw 514. A resin part 504 is firmly fixed by way of the nanomold technique. A printed circuit board 511 can be firmly fixed so as to come into contact with the resin part 504 by way of bonding, screwing, fitting or use of other components, or a combination thereof. As a result, an encoder with a highly rigid housing is obtained.

Figure 6:
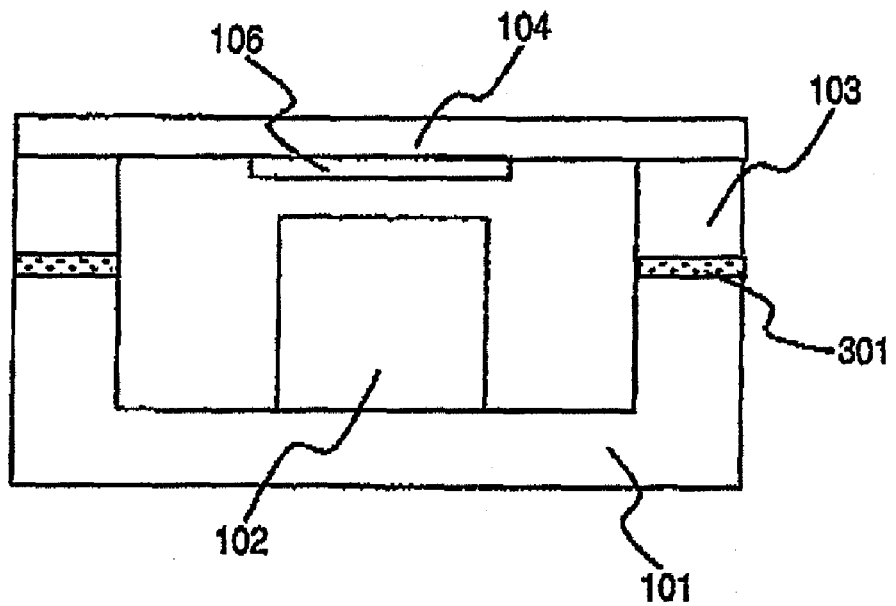
FIG. 6 It is a cross-sectional view of the general structure of a related art optical encoder.

In the embodiment shown in FIG. 2, an adhesive may be used to bond the resin part 504 and the printed circuit board 511 although this approach is different from the exemplary related art structure shown in FIG. 6. In the example of FIG. 6, the adhesive part supports the mass of both components, that is, an insulating part 103 and a printed circuit board 104. In the example of FIG. 2, the adhesive part supports only the printed circuit board 511. Thus, the mass supported by the adhesive part in FIG. 2 is smaller than that in FIG. 6. This reduces a load on the adhesive part and enhances rigidity thereby improving the reliability of the adhesive part.

While the structure of an optical encoder is specifically illustrated in this embodiment, the same effect is obtained for encoders of other systems, such as a magnetic encoder.

Exemplary Embodiment 2

FIG. 3 shows the structure of an electronic device housing that requires sealing property according to another embodiment. The illustrated electronic device as an example includes a detector outside its housing and includes a printed circuit board for signal processing inside the housing.

The example is a magnetic encoder mounted on a motor, the encoder including a magnetic disc mounted on the end of the rotor shaft of the motor and a magnetic detector mounted on the outer surface of the electronic device housing, with the electronic device housing sealed inside and accommodating a printed circuit board.

FIG. 3(*a*) is a cross-sectional view of the electronic device. FIG. 3(*b*) is a top view of the electronic device with a lid 606 removed. In FIG. 3, a base part 601 is made of a metal such as aluminum die cast. A resin part 602 is fixed to the base part 601 at a nanomold part 603. A printed circuit board 605 is arranged inside a sealed housing and is connected to a detector 607 outside the housing by way of a flexible printed circuit 608. The resin part 602 includes a space for receiving an O-ring 604 for maintaining sealing property (an exemplary component to maintain sealing property in this embodiment). The O-ring 604 comes into contact with the resin part 602, the base part 601, and the lid 606.

The resin part 602 has an extremely smooth surface and maintains sealing property when an O-ring 604 is in contact.

The base part 601 made of a metal generally exhibits a cast surface that is a relatively rough surface especially in case it is made of aluminum die cast. Additional treatment may be carried out to provide sealing property. A space may be machined onto the aluminum die cast to accommodate an O-ring 604. Further, sealing treatment may be made to clog cavities inherent to a casting.

While the portion of the base part 601 against which the O-ring 604 abuts is a cast surface that is a relatively rough surface in case the base part 601 is made of aluminum die cast, the portion is fixed to the resin part 602 at the nanomold part 603 thus maintaining sufficient sealing property at the boundary of the resin part 602 and the base part 601.

While a related art electronic device housing using a die cast base part alone requires a complicated process of machining to provide a sealed electronic device housing, an electronic device housing according to this embodiment eliminates the need for an additional machining process to obtain sealing property.

While a circular portion receiving an O-ring can be machined by way of a relatively simple method such as turning, a polygonal shape, not a circular shape, shown in FIG. 3 according to this embodiment requires a complicated machining process such as milling that takes considerable machining time. With the electronic device housing according to this embodiment, no additional machining processes to obtain sealing property are necessary. The component O-ring 4 for maintaining sealing property may be a component such as an oil seal.

The above embodiment solves the problems of reduced accuracy of a detector 106 to position a rotary part 102, reduction in the area of a printed circuit board that can be used effectively, and reduction in the rigidity of the overall structure. This facilitates positioning, allows effective use of the area of a printed circuit board and enhances the rigidity of the overall structure.

Other advantages are reduction in the number of components and easier construction. Such advantages are eminent with an electronic device accommodating a compact printed circuit board.

With the above embodiment of an electronic device housing that requires sealing property, a machining process to obtain sealing property is no longer used and sealing property is obtained with extreme ease. This is especially advantageous with a sealed portion having a shape other than a circle, for example a polygon.

The invention is not limited to the foregoing embodiments but includes various design changes.

INDUSTRIAL APPLICABILITY

The invention is suitable for a housing of an electronic device, in particular for a housing of a compact encoder used for a servo motor in a drive controller, which incorporates a printed circuit board and requiring a rigid structure and thus has a high industrial applicability.

The invention claimed is:

1. An electronic device housing comprising:
   a base part;
   a resin part fixed to the base part and supporting an electronic device inside the base part; and
   a lid body sealing the inside of the base part by way of an intervening sealing support member;
   wherein the base part is made of aluminum including asperities in the nanometer order formed on a surface thereof,
   wherein the resin part is made of an insulating resin,
   wherein the resin of the resin part is bonded to the asperities via a key structure to fix together the base part and the resin part, and
   wherein an electronic device provided in the base part is connected to a detector via a flexible printed circuit, the detector provided outside the base part.

2. The electronic device housing according to claim 1, wherein the electronic device housing is applied to an electronic device including a rotary part.

3. The electronic device housing according to claim 1, wherein the electronic device housing is applied to a detector.

4. The electronic device housing according to claim 3, wherein the detector is an encoder.

\* \* \* \* \*